Dec. 30, 1958 E. W. WAGNER ET AL 2,866,325
OVERLOAD RELEASE CLUTCH
Filed Jan. 2, 1957 3 Sheets-Sheet 1
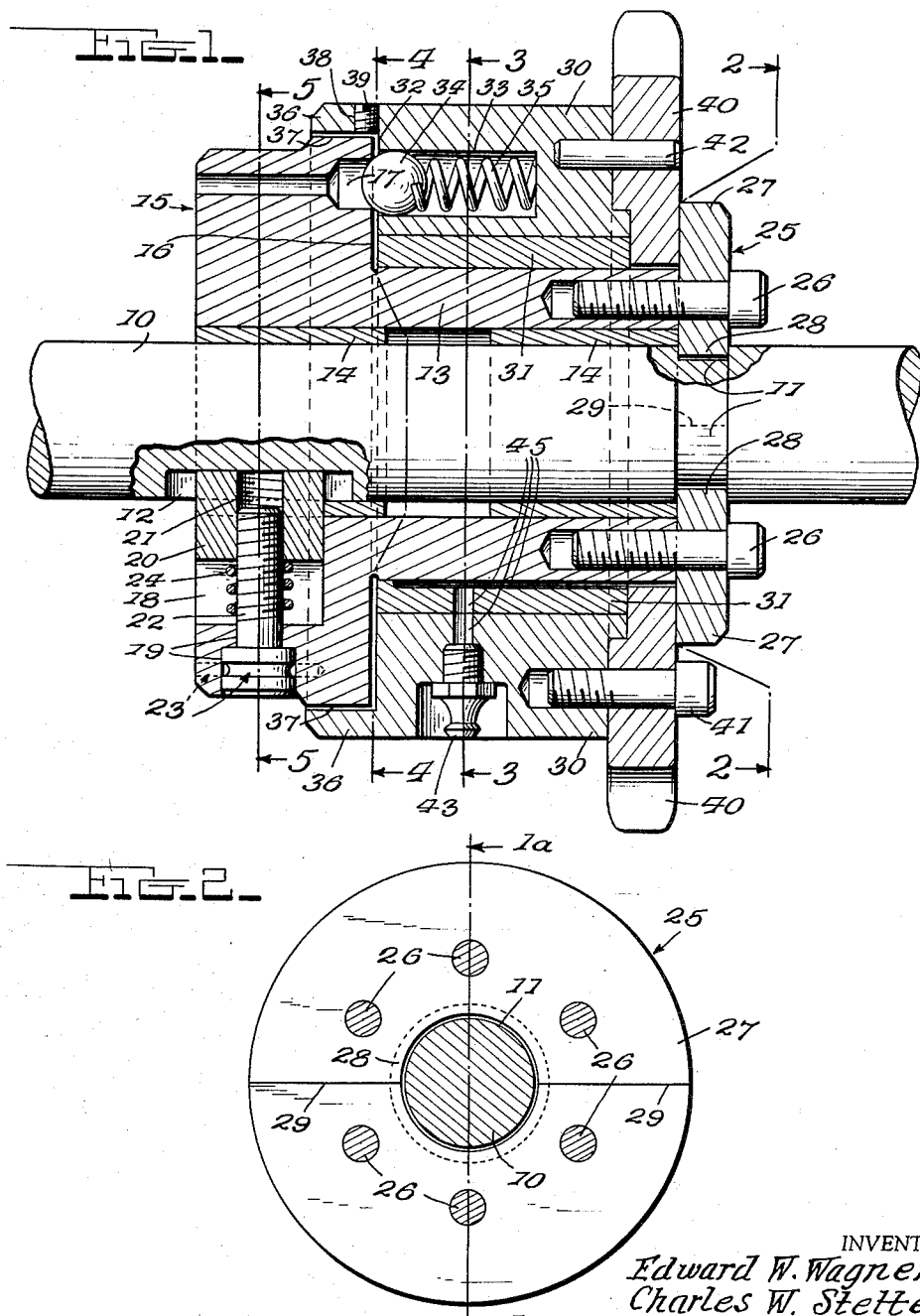
INVENTORS
Edward W. Wagner
Charles W. Stetter.
BY
Mason, Porter, Diller & Stewart
ATTORNEYS Dec. 30, 1958     E. W. WAGNER ET AL     2,866,325
OVERLOAD RELEASE CLUTCH
Filed Jan. 2, 1957     3 Sheets-Sheet 2
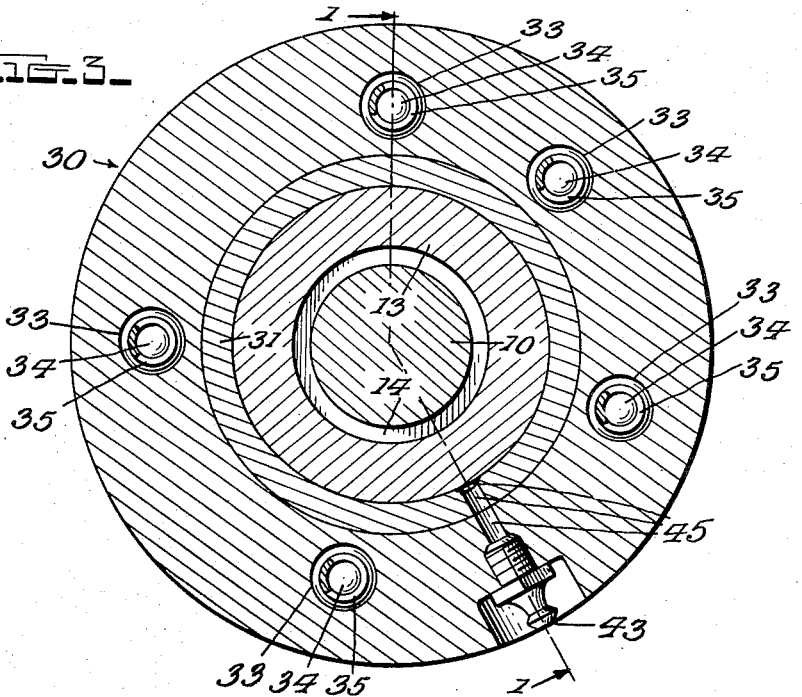
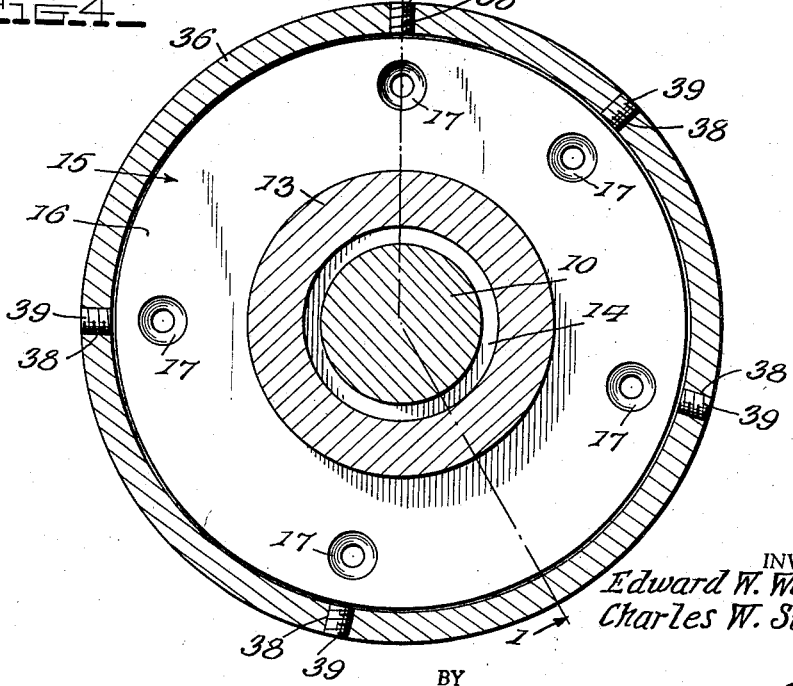
INVENTORS
*Edward W. Wagner*
*Charles W. Stetter*
BY
ATTORNEYS Dec. 30, 1958  E. W. WAGNER ET AL  2,866,325
OVERLOAD RELEASE CLUTCH
Filed Jan. 2, 1957  3 Sheets-Sheet 3
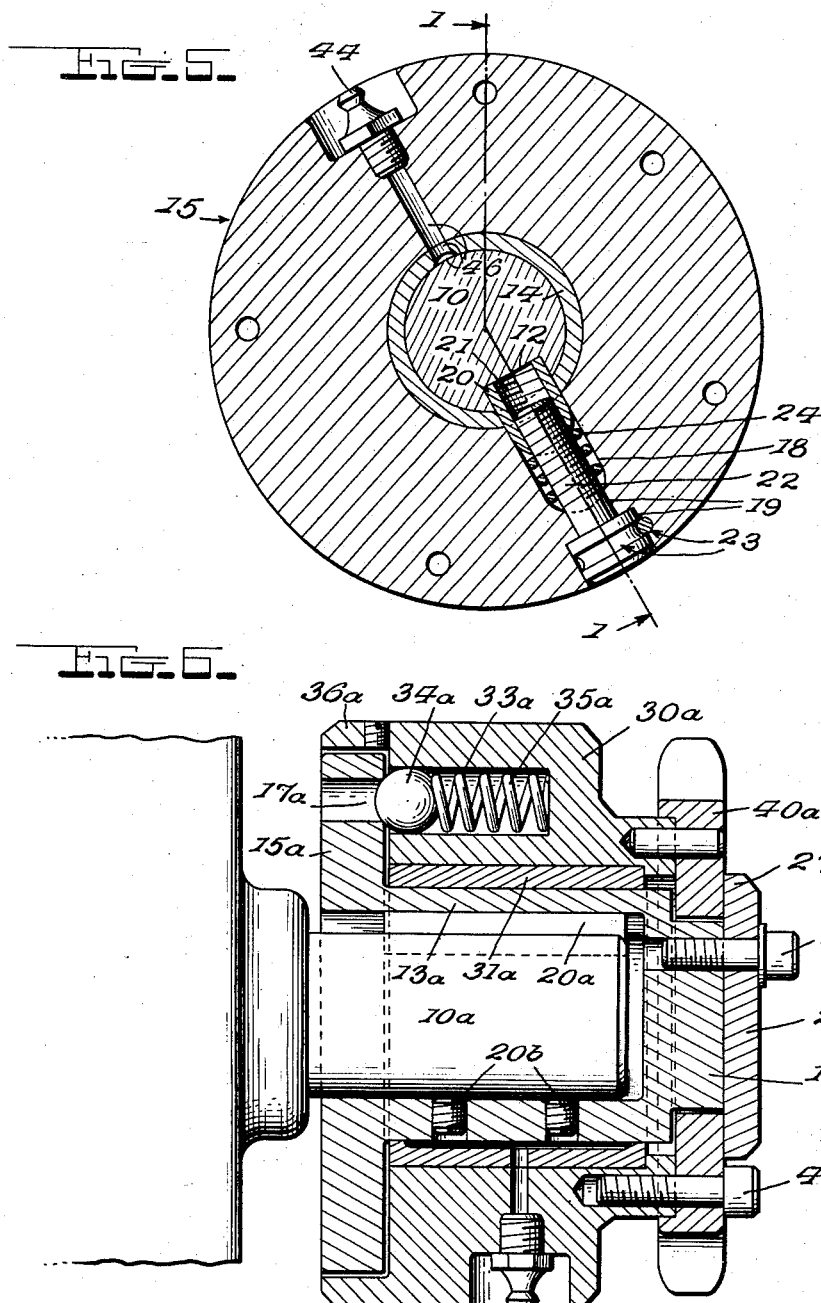
INVENTORS
*Edward W. Wagner*
*Charles W. Stetter*
BY
*Mason, Porter, Diller & Stewart*
ATTORNEYS

United States Patent Office 2,866,325
Patented Dec. 30, 1958.

2,866,325

OVERLOAD RELEASE CLUTCH

Edward W. Wagner, Maywood, and Charles W. Stetter, Paterson, N. J., assignors to Continental Can Company, Inc., New York, N. Y., a corporation of New York Application January 2, 1957, Serial No. 632,114

3 Claims. (Cl. 64—29)

This invention relates to a new and improved clutch for driving a load and releasing automatically in case of overload. In the present disclosure, the clutch is of the general type in which clutch re-engagement after automatic release can occur only when the drive shaft and clutch again have the same predetermined relation in which they were connected prior to release, thus preventing the load from being driven out of proper timed relation with the shaft.

The principal object of the invention has been to provide an exceptionally simple and inexpensive yet a highly reliable and durable overload release clutch requiring no attention after installation, other than lubrication.

Another object has been to provide one form of construction to be mounted on and driven by a drive shaft other than a motor shaft, and a second form to be mounted on and driven by a motor shaft, the two forms embodying a number of generic and novel features of construction.

A clutch hub has been provided to surround and be driven by the drive shaft, this hub is surrounded by a load-driving sleeve, and at least one spring-pressed hub-and-sleeve-connecting-member has been provided to normally establish a yieldable driving connection from said hub to said load-driving sleeve: and still another object has been to make novel provision for holding said load-driving sleeve against endwise shifting on said hub.

A further object has been to provide a thrust plate secured to one end of the hub and an enlarged head on the other end of said hub, the load-driving sleeve being confined between said thrust plate and head.

A still further object has been to provide a novel construction in which a load-driving sprocket is secured to the load-driving sleeve and also constitutes a thrust member cooperable with the hub-carried thrust plate.

Another object has been to provide a novel construction in which the hub-carried thrust plate projects inwardly from the hub and so engages the drive shaft as to hold said hub against endwise shifting on said shaft.

Still another object has been to provide the hub-carried thrust plate in annular form, and to provide the drive shaft with a circumferential peripheral groove receiving the inner peripheiral portion of this annular thrust plate, to hold the hub against the above mentioned endwise shifting of the hub.

Yet another object has been to make novel provision for disconnecting the hub from the drive shaft, whenever advisable, to permit said shaft to rotate without driving the clutch.

With the above and other objects in view that will hereinafter appear, the nature of the invention will be more clearly understood by reference to the following detailed description, the appended claims and the several views illustrated in the accompanying drawings.

In the drawings:

Figure 1 of the drawings is a longitudinal sectional view of the form of construction to be mounted on a drive shaft other than a motor shaft, this view being cut primarily on the lines 1—1 of Figures 3, 4 and 5, but partially on line 1a—1a of Figure 2.

Figures 2, 3, 4 and 5 are transverse sectional views on the correspondingly numbered lines of Figure 1, Figure 2 being viewed in the opposite direction from Figures 3, 4 and 5.

Figure 6 is a view similar to Figure 1 but showing the form of construction to be mounted on a motor shaft.

The forms of construction disclosed in the drawings have proven to be of advantage from numerous standpoints and will be rather specifically described, but it is, of course, possible to make variations within the scope of the invention. Attention is first directed to Figures 1 to 5.

The drive shaft 10 is formed with a circumferential peripheral groove 11 and with a peripheral recess 12 spaced longitudinally of the shaft from said groove. A cylindrical hub-forming sleeve 13 surrounds the drive shaft 10 and is provided with bushings 14 contacting therewith. One end of this sleeve 13 has an enlarged integral head 15 concentric therewith and formed with an annular inner end surface 16. This head 15 is formed with sockets 17 opening through the surface 16 and spaced apart circumferentially of said head, and the spacing of these sockets is such that the distance between any two succeeding sockets is different from that between any other two succeeding sockets, for a purpose to appear.

The outer side of the head 15 is formed with a radial recess 18 which opens through the inner periphery of said head. This head also has a countersunk radial opening 19 from the outer end of the recess 18 to the periphery of the head. A key block 20 is slidably received in the recess 18 and is formed with a radial opening 21 aligned with the opening 19 of the head 15. This key block 20 normally projects into the drive shaft recess 12 to establish a driving connection from the drive shaft 10 to the hub sleeve 13.

A socket-head screw 22 is confined by a pin and groove at 23 in the countersunk opening 19 of the head 15 and is threaded into the opening 21 of the key block 20 for withdrawing said key block from the shaft recess 12 whenever it is desired that said shaft shall not rotate the hub sleeve 13, and for re-engaging said key block with said recess when desired. A compression spring 24 preferably surrounds the screw 22 and is interposed between the outer end wall of the recess 18 and the key block 20.

An annular thrust plate 25 is secured by screws 26 against the end surface of the hub sleeve 13 remote from the head 15. The outer peripheral portion 27 of this thrust plate 25 projects beyond the outer periphery of the sleeve 13 for a purpose to appear. The inner peripheral portion 28 of the thrust plate 25 projects beyond the inner periphery of said sleeve 13 into the shaft groove 11, and therefore holds the sleeve 13 against shifting longitudinally of the shaft 10. In order that the portion 28 of the plate 25 may be inserted into the groove 11, said plate is radially divided at 29 into at least two sections.

An outer cylindrical load-driving sleeve 30 surrounds the hub sleeve 13. The inner annular end surface 32 of the outer sleeve 30 is disposed in close relation with the annular surface of the head 15; and said sleeve 30 is formed with elongated sockets 33 so spaced as to align with the sockets 17 of the head 15. Driving balls 34 and springs 35 are disposed in the sockets 33, said balls 34 being normally held in engagement with the sockets 17 by the springs 35 and thereby establishing a yieldable driving connection from the hub sleeve 13 to the load-driving sleeve 30. In case of overload, the balls 34 yield from the sockets 17 and allow the shaft 10 and hub sleeve 13 to rotate without driving the load-driving sleeve 30. It requires the combined action of all of the balls 34 to drive the load in the present disclosure and resumption of load driving can therefore only occur at the end of one or more complete revolutions of the drive shaft 10. It will be obvious, however, that with one ball and a sufficiently strong spring, the same result could be attained.

The sleeve 30 has an integral cylindrical flange 36 projecting beyond the surface 32 and closely surrounding the peripheral portion 37 of the head 15 to exclude foreign matter. This flange 36 is formed with openings 38, disposed near the open ends of the sockets 33 respectively. During assembly, radial screws (not shown) may be threaded through the openings 38 to hold the balls 34 against jumping from the sockets 33. After assembly, the radial screws are removed and the openings 38 are then closed by plugs 39.

A load-driving sprocket 40 is secured by screws 41 and a dowel pin 42 to the end of the load-driving sleeve 30 remote from the head 15. The outer side of the sprocket 40 contacts with the portion 27 of the thrust plate 25 and the reactive thrust of the springs 35 cannot therefore slide the sleeve 30 away from the head 15.

Suitable lubricating nipples 43 and 44 and associated ports 45 and 46 have been shown for the bushings 14 and 31 and the surfaces contacting therewith.

In Figure 6, the hub sleeve 13a is provided with no bushing and is secured to a motor shaft 10a by a key 20a and set screws 20b. The head 15a has the sockets 17a for coaction with the balls 34a. These balls and their springs 35a are mounted in the sockets 33a of the load driving sleeve 30a, said sleeve 30a having the bushing 31a. The load-driving sprocket 40a is secured at 41a to the closed outer end 13b of the hub sleeve 13a and abuts the portion 27a of the thrust plate 25a secured at 26a to the hub sleeve 13a. The sleeve 30a has the flange 36a surrounding the head 15a. The relation of balls and sockets and the general relation of the other elements mentioned in this paragraph are the same as above described in connection with Figures 1 to 5.

From the foregoing, it will be seen that novel and advantageous construction has been disclosed for attaining the desired ends. Attention is again invited, however, to the possibility of making variations within the scope of the invention.

We claim:

1. An overload release clutch comprising a cylindrical hub sleeve to be connected with a drive shaft for rotation with the same, one end of said hub sleeve being provided with an enlarged head concentric with said sleeve, said head having an annular inner end surface and at least one socket which opens through this end surface, an outer cylindrical load-driving sleeve rotatably surrounding said hub sleeve and having an anunlar inner end surface closely related with said annular inner end surface of said head, said outer sleeve having at least one elongated socket which opens through its annular inner end surface in alignment with the aforesaid socket of said head, a driving element mounted in said elongated socket, a spring also mounted in this socket and holding said driving element yieldably seated in the socket of said head, a sprocket concentric with said sleeves and secured against the end surface of said outer sleeve remote from said head, a thrust plate lying against the outer side of said sprocket and holding the latter and said outer sleeve against sliding under the influence of the aforesaid spring, means securing said thrust plate to the contiguous end of said hub sleeve, and releasable means in the aforesaid head for connecting said hub sleeve with the drive shaft, said thrust plate being of annular form and projecting inwardly beyond said hub sleeve to engage the drive shaft and hold said hub sleeve against endwise shifting on the shaft.

2. An overload release clutch comprising a cylindrical hub sleeve to be connected with a drive shaft for rotation with the same, one end of said hub sleeve being provided with an enlarged head concentric with said sleeve, said head having an annular inner end surface and at least one socket which opens through this end surface, an outer cylindrical load-driving sleeve rotatably surrounding said hub sleeve and having an anunlar inner end surface closely related with said annular inner end surface of said head, said outer sleeve having at least one elongated socket which opens through its annular inner end surface in alignment with the aforesaid socket of said head, a driving element mounted in said elongated socket, a spring also mounted in this socket and holding said driving element yieldably seated in the socket of said head, a sprocket concentric with said sleeves and secured against the end surface of said outer sleeve remote from said head, a thrust plate lying against the outer side of said sprocket and holding the latter and said outer sleeve against sliding under the influence of the aforesaid spring, means securing said thrust plate to the contiguous end of said hub sleeve, and releasable means in the aforesaid head for connecting said hub sleeve with the drive shaft, said thrust plate being of annular form and projecting inwardly beyond said hub sleeve to engage the drive shaft and hold said hub sleeve against endwise shifting on the shaft, said thrust plate being radially divided into sections for the purpose set forth.

3. In an overload release clutch and drive shaft assembly, a drive shaft having a circumferentially extending peripheral groove, said drive shaft also having a peripheral recess spaced longitudinally of the shaft from said groove, a load driving overload release clutch having a hub surrounding said drive shaft, thrust means carried by said hub and projecting into the aforesaid groove for holding said hub against endwise shifting on said drive shaft, and manually releasable hub and shaft connecting means carried by said hub and normally projecting into the aforesaid peripheral recess of said drive shaft, said hub having a radial guideway and a radial opening from said guideway to the periphery of said hub, a key block slidable radially in said guideway and normally projecting into said recess, said key block having an opening aligned with the first mentioned opening, and a radial screw confined at its outer end in said first mentioned opening, the inner end of said screw being threaded into said opening of said key block for withdrawing the latter from said recess, said key block constituting said manually releasable hub and shaft connecting means.

References Cited in the file of this patent

UNITED STATES PATENTS

| 2,609,674 | Groat | Sept. 9, 1952 |
| 2,674,357 | Garik | Apr. 6, 1954 |
| 2,748,578 | Potts | June 5, 1956 |

FOREIGN PATENTS

| 260,447 | Italy | Sept. 19, 1928 |